United States Patent
Kumar et al.

(10) Patent No.: US 10,462,234 B2
(45) Date of Patent: Oct. 29, 2019

(54) APPLICATION RESILIENCE SYSTEM AND METHOD THEREOF FOR APPLICATIONS DEPLOYED ON PLATFORM

(71) Applicant: Huawei Technologies Co., Ltd., Shenzhen (CN)

(72) Inventors: Krishna Mankili Kumar, Bangalore (IN); Deepak Vij, Santa Clara, CA (US); Shengjun Tang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/247,024

(22) Filed: Jan. 14, 2019

(65) Prior Publication Data

US 2019/0149622 A1    May 16, 2019

Related U.S. Application Data

(63) Continuation of application No. PCT/CN2017/091508, filed on Jul. 3, 2017.

(30) Foreign Application Priority Data

Jul. 13, 2016    (IN) .............................. 201641024007

(51) Int. Cl.
*H04L 29/08* (2006.01)

(52) U.S. Cl.
CPC .............. *H04L 67/16* (2013.01); *H04L 67/10* (2013.01)

(58) Field of Classification Search
CPC ..................................................... H04L 67/10
See application file for complete search history.

(56) References Cited

U.S. PATENT DOCUMENTS

| | | |
|---|---|---|
| 8,117,478 B2 | 2/2012 | Liu et al. |
| 8,689,282 B1 | 4/2014 | Oprea et al. |
| 8,869,035 B2 * | 10/2014 | Banerjee ................. H04L 41/12 715/733 |

(Continued)

FOREIGN PATENT DOCUMENTS

| | | |
|---|---|---|
| CN | 101753992 A | 6/2010 |
| CN | 101901399 A | 12/2010 |

(Continued)

OTHER PUBLICATIONS

Machine Translation and Abstract of Chinese Publication No. CN101753992, Jun. 23, 2010, 20 pages.

(Continued)

*Primary Examiner* — Lashonda T Jacobs
(74) *Attorney, Agent, or Firm* — Conley Rose, P.C.

(57) ABSTRACT

An application resilience framework, where a monitoring engine of the framework monitors an application and captures data associated with the application. A processor analyzes the data captured to associate an event retrieved from the data captured with an action in a pre-stored template, executes the action associated to the event as specified in the pre-stored template, identifies a status of the application, fetches the data captured, the event retrieved from the data captured, the action associated with the event retrieved the action executed, stores in a repository, and notifies at least the status of the application based on at least one notification template storing at least one value.

20 Claims, 8 Drawing Sheets

(56) References Cited

U.S. PATENT DOCUMENTS

| | | | | |
|---|---|---|---|---|
| 9,652,337 | B2* | 5/2017 | Iyengar | G06F 11/1469 |
| 9,858,431 | B2* | 1/2018 | Farkash | G06F 21/6209 |
| 10,097,410 | B2* | 10/2018 | Singh | H04L 41/0813 |
| 10,157,092 | B2* | 12/2018 | Sengupta | G06F 11/076 |
| 10,169,220 | B2* | 1/2019 | Rajagopalan | G06F 11/3688 |
| 2004/0123244 | A1* | 6/2004 | Campbell | G06F 17/211 |
| | | | | 715/253 |
| 2005/0268280 | A1* | 12/2005 | Fildebrandt | G06F 8/36 |
| | | | | 717/113 |
| 2009/0164499 | A1* | 6/2009 | Samudrala | G06F 21/604 |
| 2010/0205617 | A1 | 8/2010 | Hogan et al. | |
| 2011/0145208 | A1* | 6/2011 | Kol | G06Q 10/10 |
| | | | | 707/694 |
| 2011/0302569 | A1* | 12/2011 | Kunze | G06F 8/62 |
| | | | | 717/169 |
| 2012/0216115 | A1* | 8/2012 | Lorenceau | G06Q 10/10 |
| | | | | 715/704 |
| 2013/0013953 | A1 | 1/2013 | Eck et al. | |
| 2013/0086203 | A1 | 4/2013 | Avner et al. | |
| 2013/0117769 | A1 | 5/2013 | Sharma et al. | |
| 2014/0075016 | A1 | 3/2014 | Chatterjee et al. | |
| 2014/0149485 | A1* | 5/2014 | Sharma | H04L 67/142 |
| | | | | 709/202 |
| 2014/0310559 | A1* | 10/2014 | Deng | G06F 11/008 |
| | | | | 714/37 |
| 2015/0067158 | A1 | 3/2015 | Naseh et al. | |
| 2015/0081885 | A1* | 3/2015 | Thomas | G06F 9/45558 |
| | | | | 709/224 |
| 2015/0193324 | A1* | 7/2015 | McGrath | G06F 16/122 |
| | | | | 717/127 |
| 2015/0205634 | A1* | 7/2015 | McPherson | G06F 9/5027 |
| | | | | 718/102 |
| 2015/0242200 | A1* | 8/2015 | Niemoeller | G06F 9/5077 |
| | | | | 717/172 |
| 2015/0319185 | A1* | 11/2015 | Kirti | H04L 63/1416 |
| | | | | 726/23 |
| 2015/0381435 | A1* | 12/2015 | Todd | H04L 67/10 |
| | | | | 709/223 |
| 2016/0055573 | A1* | 2/2016 | Chen | G06Q 30/0641 |
| | | | | 705/26.41 |
| 2017/0039105 | A1* | 2/2017 | Shivanna | G06Q 50/00 |
| 2017/0185577 | A1* | 6/2017 | Chen | G06F 9/4488 |
| 2017/0300706 | A1* | 10/2017 | Jassal | G06F 21/6218 |
| 2017/0339176 | A1* | 11/2017 | Backer | H04L 63/1425 |
| 2017/0353348 | A1* | 12/2017 | Gunjal | H04L 41/5025 |
| 2018/0004797 | A1* | 1/2018 | Ghosh | G06F 11/30 |
| 2018/0075008 | A1* | 3/2018 | Ganta | G06F 17/248 |
| 2018/0121881 | A1* | 5/2018 | Kumar | G06F 9/453 |
| 2018/0225325 | A1* | 8/2018 | Ghosh | G06F 9/5066 |
| 2019/0068627 | A1* | 2/2019 | Thampy | G06N 20/00 |

FOREIGN PATENT DOCUMENTS

| | | |
|---|---|---|
| EP | 2776900 | 9/2014 |
| WO | 2007135662 A1 | 11/2007 |
| WO | 2013070420 A1 | 5/2013 |

OTHER PUBLICATIONS

Machine Translation and Abstract of Chinese Publication No. CN101901399, Dec. 1, 2010, 8 pages.
Foreign Communication From a Counterpart Application, PCT Application No. PCT/CN2017/091508, English Translation of International Search Report dated Oct. 11, 2017, 7 pages.
Foreign Communication From a Counterpart Application, PCT Application No. PCT/CN2017/091508, English Translation of Written Opinion dated Oct. 11, 2017, 4 pages.
Foreign Communication From a Counterpart Application, European Application No. 17826902.3 Extended European Search Report dated Mar. 25, 2019, 13 pages.

* cited by examiner

APPLICATION RESILIENCE SYSTEM AND METHOD THEREOF FOR APPLICATIONS DEPLOYED ON PLATFORM

CROSS-REFERENCE TO RELATED APPLICATIONS

This application is a continuation of International Patent Application No. PCT/CN2017/091508 filed on Jul. 3, 2017, which claims priority to Indian Patent Application No. IN201641024007 filed on Jul. 13, 2016. Both of the above-mentioned patent applications are hereby incorporated by reference in their entireties.

TECHNICAL FIELD

The present disclosure described herein, in general, relates to a framework and a method for application resilience for applications deployed on platform-as-a-service (PaaS) clouds, and in particular, to the framework and the method thereof for application resilience in PaaS cloud.

BACKGROUND

As more organizations adopt cloud computing for developing and deploying applications on outsourced infrastructure, a new set of capabilities and challenges have emerged. While cloud computing promises seemingly elastic capacity and scaling, certain present architectural limitations in cloud platforms limit the seamless transition of applications to clouds (e.g., state management and fault tolerance (FT) in the stacks of different PaaS clouds).

As conventionally known, application resilience is the ability of an application to react to problems in one of its components and still provide the best possible service. Resiliency has become more important as organizations continue to rapidly implement software across multi-tier, multiple technology infrastructures. As well known, complex, multiple technology environments have a higher degree of failure and security issues.

The application resilience is a term used very broadly that includes FT, high availability (HA), disaster recovery (DR), and other planned and unplanned outages. Major characteristics of the multiple data center deployment are capacity, latency, performance, resiliency, DR, hot-swap capability, re-routing requests, data synchronization, federated identity and regulatory compliance, in which resilience is a primary component that application and data availability for the customer is the primary focus.

In spite of numerous techniques employed by the vendors to make application resilience on the platform there is no standard framework that describes what application resilience in cloud means. As well known, the cloud community is fragmented on their own designs of cloud and so no standards for application developers and testers to follow how a cloud application should behave in case of outage. This is true with customers also that they are not aware what application resilience is involved with. There are other approaches literatures disclosing framework in some research papers published on cloud services and other platforms, but the papers do not address the broad concerns of the application resilience in PaaS cloud including all the parties involved.

In order to summarize the technical issues involved in the field of application resilience for applications, one of the technical problems majorly faced for application resilience for applications is that, as application resilience is mandatory for all the cloud applications, deployment and the mechanisms implemented by vendors varied a lot in nature for each and every cloud. There is no standard framework describing what application resilience in cloud means and how it can be implemented. Also, the cloud outages happens, rarely though, but cloud community is fragmented on their own designs of outage handling. Hence, there are no standards for application developers and testers to follow how a cloud application should behave in case of outage. This outage scenario is very troublesome that anyone could be claiming application resilience but not really following any standards.

Hence, there is a dire need to develop a standard framework that will help all the parties involved to adhere to it and follow the constraints to make applications resilience in cloud. Thus it will be very beneficial to have a cloud framework which deals with application resilience.

SUMMARY

This summary is provided to introduce concepts related to application resilience framework and method thereof for applications, and the same are further described below in the detailed description. This summary is not intended to identify essential features of the claimed subject matter nor is it intended for use in determining or limiting the scope of the claimed subject matter.

A main objective of the present disclosure is to solve the technical problem as recited above by providing a framework for application resilience in PaaS cloud.

In one aspect, the present disclosure provides a deployment model, a mechanism and a process for cloud applications which are resilience to FT, HA, DR, and the like issues.

In another aspect, the present disclosure provides a framework and the method thereof for application resilience in PaaS cloud. The framework and the method utilizes a user customizable template based approach, a work engine for policy framework implementation, a self-learning framework mechanism, an alert and an notification mechanism for the users, for application resilience in PaaS cloud.

Accordingly, in one implementation, an application resilience system for at least an application is disclosed. The application resilience system comprises a monitoring engine, an analysis module, a self-learning module, and a notification module. The monitoring engine is configured to monitor the application and capture the data associated with the application. The analysis module is configured to analyze the data captured by the monitoring engine to associate at least an event retrieved from the data captured with at least one action in at least one pre-stored template, execute the action associated to the event, the action is at least specified in the pre-stored template, and thereby identify at least a status of the application. The self-learning module coupled to the analysis module and configured to fetch at least the data captured, the event retrieved from the data captured, the action associated with the event retrieved the action executed by the analysis module, and store in at least a repository. The notification module having at least one notification template storing at least one value and configured to notify at least the status of the application.

In one implementation, an application resilience system for at least an application is disclosed. The application resilience system comprises an engine configured to analyze the data captured, by monitoring the application, to associate at least an event retrieved from the data captured with at least one action in at least one pre-stored template, execute the action associated to the event, the action is at least specified in the pre-stored template, and thereby identify at least a status of the application.

In one implementation, an application resilience system for at least an application is disclosed. The application resilience system comprises an engine configured to analyze the data captured, by monitoring the application, to associate at least an event retrieved from the data captured with at least one action in at least one pre-stored template, the pre-stored template is customizable, execute the action associated to the event, the action is at least specified in the pre-stored template, and thereby identify at least a status of the application. The application resilience system further comprises a self-learning module coupled to the engine and is configured to fetch at least the data captured, the event retrieved from the data captured, the action associated with the event retrieved the action executed by the analysis module, and store in at least a repository.

In one implementation, an application resilience method for at least an application is disclosed. The application resilience method comprises monitoring, using at least a monitoring means, the application and thereby capturing the data associated with the application, analyzing the data captured to associate at least an event retrieved from the data captured with at least one action in at least one pre-stored template, executing the action associated to the event, the action is specified in the pre-stored template, identifying at least a status of the application, fetching at least the data captured, the event retrieved from the data captured, the action associated with the event retrieved the action executed by the analysis module, and store in at least a repository, and notifying at least the status of the application based on at least one notification template storing at least one value.

In one implementation, an application resilience method for at least an application is disclosed. The application resilience method comprises analyzing the data captured, by monitoring the application, to associate at least an event retrieved from the data captured with at least one action in at least one pre-stored template, executing the action associated to the event, the action is at least specified in the pre-stored template, and thereby identifying at least a status of the application.

In one implementation, an application resilience method for at least an application is disclosed, the application resilience method comprises analyzing the data captured, by monitoring the application, to associate at least an event retrieved from the data captured with at least one action in at least one pre-stored template, the pre-stored template is customizable, executing the action associated to the event, the action is at least specified in the pre-stored template, thereby identifying at least a status of the application, and fetching at least the data captured, the event retrieved from the data captured, the action associated with the event retrieved the action executed by the analysis module, and store in at least a repository.

In contrast to the other techniques, systems or mechanisms or frameworks available, if any, the present disclosure provides a framework for application resilience in PaaS cloud utilizing user customizable template based approach which identify and assign the event occurred for the application with those tasks to the specific action in the template, a work engine for policy framework implementation to validate the application state and to involve the appropriate action for that validated application state, a self-learning framework mechanism for storing the relevant information associated with the task and re-utilize it when similar even occurs, and an alert and an notification mechanism for users to notify and alert the user about the resilience and application status under fault.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 2A illustrates default template and FIG. 2B illustrates custom template, in accordance with an embodiment of the present disclosure.

It is to be understood that the attached drawings are for purposes of illustrating the concepts of the disclosure and may not be to scale.

DESCRIPTION OF EMBODIMENTS

The following clearly describes the technical solutions in some of the embodiments of the present disclosure with reference to the accompanying drawings in some of the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the disclosure may take, may be referred to as techniques. In general, the order of the steps of disclosed processes may be altered within the scope of the present disclosure.

A detailed description of one or more embodiments of the present disclosure is provided below along with accompanying FIGS. that illustrate the principles of the present disclosure. The present disclosure is described in connection with such embodiments, but the present disclosure is not limited to any embodiment. Numerous specific details are set forth in the following description in order to provide a thorough understanding of the present disclosure. These details are provided for the purpose of example and the disclosure may be practiced according to the claims without some or all of these specific details. For the purpose of clarity, technical material that is known in the technical fields related to the present disclosure has not been described in detail so that the present disclosure is not unnecessarily obscured.

A system for application resilience in PaaS cloud is disclosed.

While aspects are described for a framework for application resilience in PaaS cloud, the present disclosure may be implemented in any number of different computing systems, environments, and/or configurations, the embodiments are described in the context of the following exemplary systems, apparatus, and methods.

In one implementation, the present disclosure provides a system for application resilience in PaaS cloud.

Figure 1:
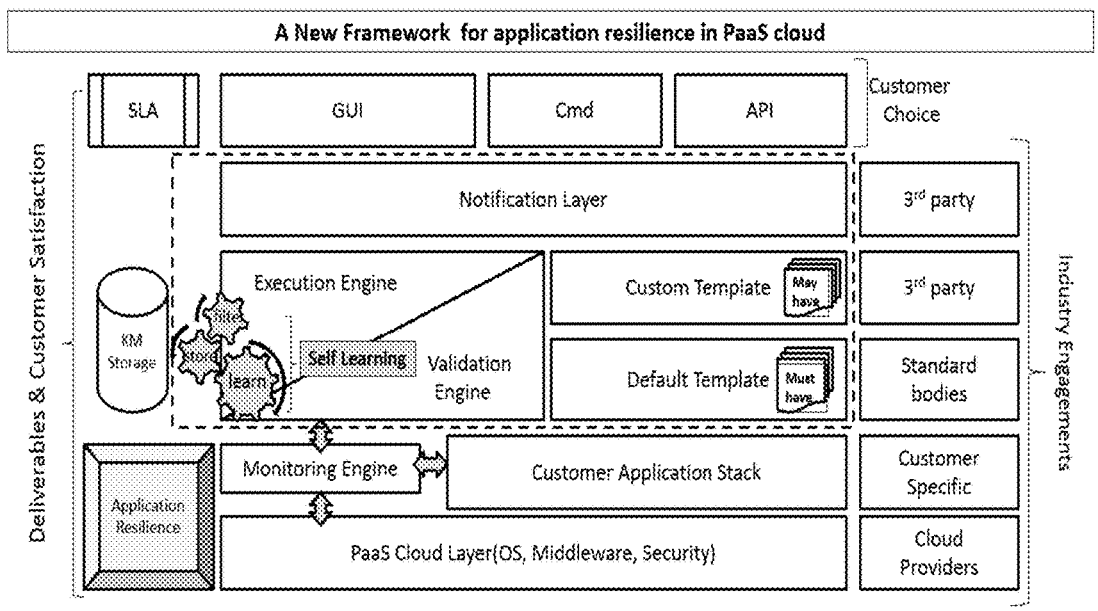
FIG. 1 illustrates a framework for application resilience in PaaS cloud, in accordance with an embodiment of the present disclosure.

Referring now to FIG. 1, a framework/system for application resilience in PaaS cloud is illustrated, in accordance with an embodiment of the present disclosure. The blocks as shown in the FIG. 1 are the major components of the present disclosure. It may be understood by the person skilled in that art, that the other components apart from the dotted lines may be already well known components/features in the other approaches or may be irrelevant from the present disclosure's point of view. Hence, the details of the same are not included in the description of to avoid the confusion and complexity in understanding the essential aspect of the present disclosure. Still to provide a flow in order to understand the new components and/or features of the present disclosure, some known features or components as shown in FIG. 1 are service level agreement (SLA) layer, monitoring engine, Application Stack, and PaaS Cloud Layer. The SLA enables to provide a common document format used to describe the service guarantee offered by the service provider. The SLA may include various interfaces such as but not limited to the graphical user interface (GUI), command line interface (Cmd), and Application Programming Interface (API). The GUI is the screen which shows the product features/usage. The API provides a way to connect multiple applications. Further, all cloud providers will have monitoring engine to detect the current status of the usage. The application stack enables the applications of all kind to run on top of the cloud platforms. The entire PaaS layer sits on top of Infrastructure as a Service (IaaS) including the middleware stacks. The important and essential aspects or features of the present disclosure are discussed below.

The first component as shown in the dotted line box in FIG. 1 may be the default template and custom template. These templates may capture the essential elements of the application resilience needed using any of the existing mechanism such as the tags. The templates then add appropriate elements in the template to deal with situations like DR, HA, FT, application switchover, or any other kind of error and associated actions to rectify the problem. It may be understood by the person skilled in the art that defining cloud resiliency using templates with specific action to take is not attempted in the convention techniques/mechanism. Further, defining cloud resiliency using templates may be quiet simple but may not be easy to achieve. In connection with the engine this model of execution (using default template and custom template) will produce result based on the customer input. In almost all scenarios the resiliency is controlled by the provider, so application developers have no way to define their own resiliency in cloud.

The second component as shown in the dotted line box in FIG. 1 may be an engine which does both validation and execution. Based on the template data, the validation engine may capture the criteria to be validated and pass the information to the execution engine. The execution engine may make sure the actions are performed or executed as described in the templates. It may be understood by the person skilled in the art that the developer has full control of the action or application. The application owner knows the things better how it has to be worked in better manner. This component allows the cloud provider to do resiliency in IaaS layer but automatically this helps in the PaaS layer as well.

The third component as shown in the dotted line box in FIG. 1 may be a self-learning mechanism. The self-learning mechanism may capture all the relevant information from the engine and process it as needed/as prescribed and then store the same in database. This may be used in the future knowledge generation.

The fourth component as shown in the dotted line box in FIG. 1 may be a notification layer. In one implementation, even though the notification is very common in most of the application stack, in this notification, a specific template may be used to capture all the relevant information and publish in a prescribed manner. It may be understood by the person skilled in the art that the notification layer may use the existing or any new notification mechanism for displaying the notifications to the user in accordance with the working of the present disclosure.

Figure 2A:
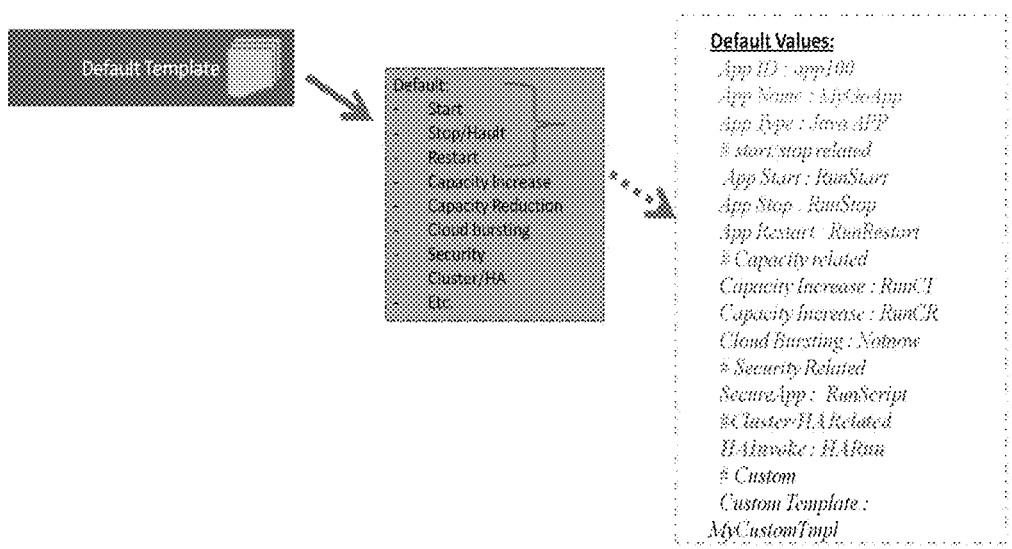
FIG. 2A and FIG. 2B illustrate a user customizable and human/machine readable.
Figure 2B:
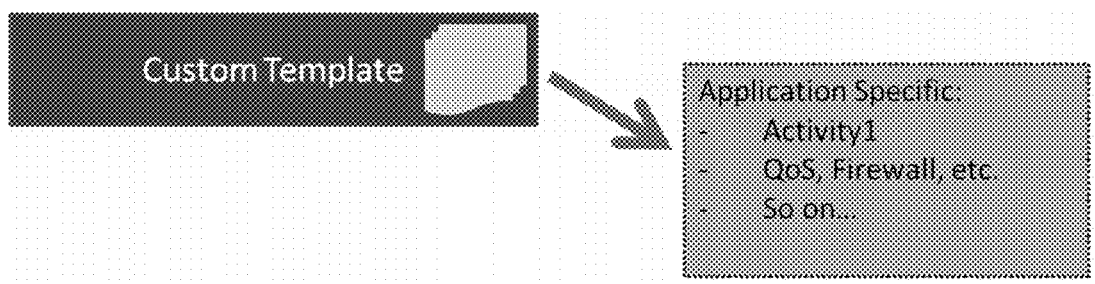

Referring now to FIGS. 2A and 2B, a user customizable and human/machine readable is illustrated, the FIG. 2A illustrates default template and the FIG. 2B illustrates custom template, in accordance with an embodiment of the present disclosure. In one implementation, the FIGS. 2A and 2B, show the pictorial representation of the templates that may be used in the present disclosure. It may be understood by the person skilled in the art that the templates are customizable templates and may be updated or revised or altered based on the user requirements or based on the requirements of the application. The FIGS. 2A and 2B, show some default values and are mere for demonstration purpose. All the relevant application states can be represented in this template and associated action can be described in it for processing.

In one implementation, the present disclosure comprises a specific file written in specific known or unknown languages and may be feed in to the engine instead of standard "Yet Another Markup Language" (YAML). As shown in the FIGS. 2A and 2B, there are two templates which handle the entire operational flow of the PaaS resilience.

In one implementation, the FIG. 2A shows the default template, which may have standard meta-tags to capture the actions. For example, the diagram shows few of them like Start, Stop/Hault, Restart, and the like. In one implementation, the default template may define the minimum operational aspect needed if an application to be called as FT or application resilience. Each application may have a default YAML file that describes the basic aspect of the application resilience. The application may follow these basic actions that will be called application resilience in PaaS. Such action may be stored in the default template.

For example, if the system is at Hault, for some reason (which could be of any kind), what action should be taken on it can be identified based on the default template. The developer of the application may clearly mention a specific type of restart, may be with some flags, or with some input parameters, etc. to alleviate the problem. This is very unique in nature and well known to the person skilled in the art. Either the cloud providers or the operators or any other kind of parties involved in it can make use of this unique way of bringing the application from the 'Hault' state. In one implementation, if this kind of application bring up, it can be uniquely captured in the template and may be shared among the application developers, they will be in a good shape to implement the present disclosure.

As shown in FIG. 2B, a custom template is shown. Considering that there could be several kinds of applications and several ways to handle the fault situation, this template will add additional tags, and hence actions, to the application profile. These additional elements could be used for application specific operations. In addition to the default action, application specific execution can be invoked from the custom template. Some application specific actions that may be present in the custom template may include but not limited to Quality of Service (QoS), firewall related actions and the like.

Figure 3:
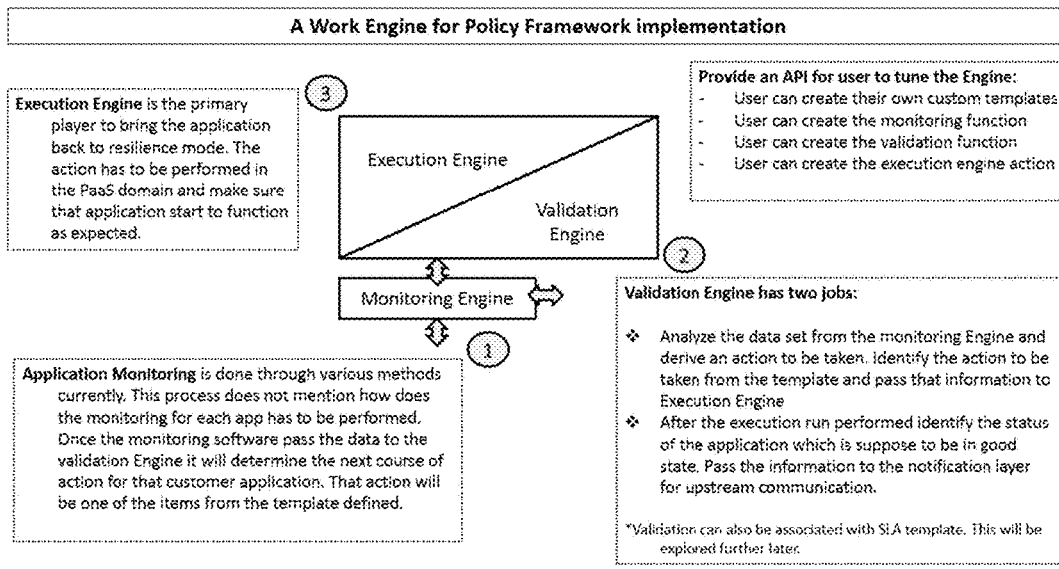
FIG. 3 illustrates a block diagram of an engine for policy framework implementation, in accordance with an embodiment of the present disclosure.

Referring now to FIG. 3, a block diagram of an engine for policy framework implementation is illustrated, in accordance with an embodiment of the present disclosure. In one implementation, the logical representation of the policy engine which may be included an execution and a validation engine is shown in FIG. 3.

In one implementation, the FIG. 3 shows that the capability of the engine may have a separate validation part and an execution part or may have a single block performing the capabilities. The validation engine may analyze the data from the monitoring engine and associate it with the template. The monitoring engine may be any of the existing techniques used to monitor the working of an application and capture the associated data with the working of the application. Thereafter the relevant execution action may be passed to the execution engine to perform. After the execution is done, the validation engine may run again to check the status of the application, as desired or not.

The execution engine further may be configured to run or execute the specific task mentioned in the templates of FIGS. 2A and 2B. These tasks could be very specific to the application deployment scenario. Hence the execution engine may be very broad in nature but specific to the task execution. The cloud providers deployment mechanism may be directly associated with the execution engine.

In one implementation, application monitoring may be the default monitoring means which is available with the standard application framework. It may be understood that the monitoring engine may provide the application status at any point of time to the validation engine.

As shown in FIG. 3, the application monitoring is done through various methods as may be available currently. It may be understood by the person skilled in the art that the application monitoring means may be any available software means or methodology that may be used for monitoring the activities of the application. Once the monitoring software pass the data to the validation engine it may determine the next course of action for that customer application. The action that may be performed may be one of the actions present in the templates of FIGS. 2A and 2B.

In one implementation, as shown in FIG. 3, the validation engine may perform two major tasks. It analyzes the data set from the monitoring engine and derives an action to be taken. It may further identify the action to be taken from the template and pass that information to the execution engine. After the execution run is performed, it identifies the status of the application which is supposed to be in good state, and thereby pass the information to the notification layer for upstream communication.

In one implementation, as shown in FIG. 3, the execution engine is a primary player to bring the application back to resilience mode. The action has to be performed in the PaaS domain and make sure that application start to function as expected.

In one implementation, as shown in FIG. 3, an interface or an API for user to tune the Engine may be provided. The API may be used to create their own customized custom templates, to create the monitoring function, to create the validation functions, and to create the execution engine action.

Figure 4:
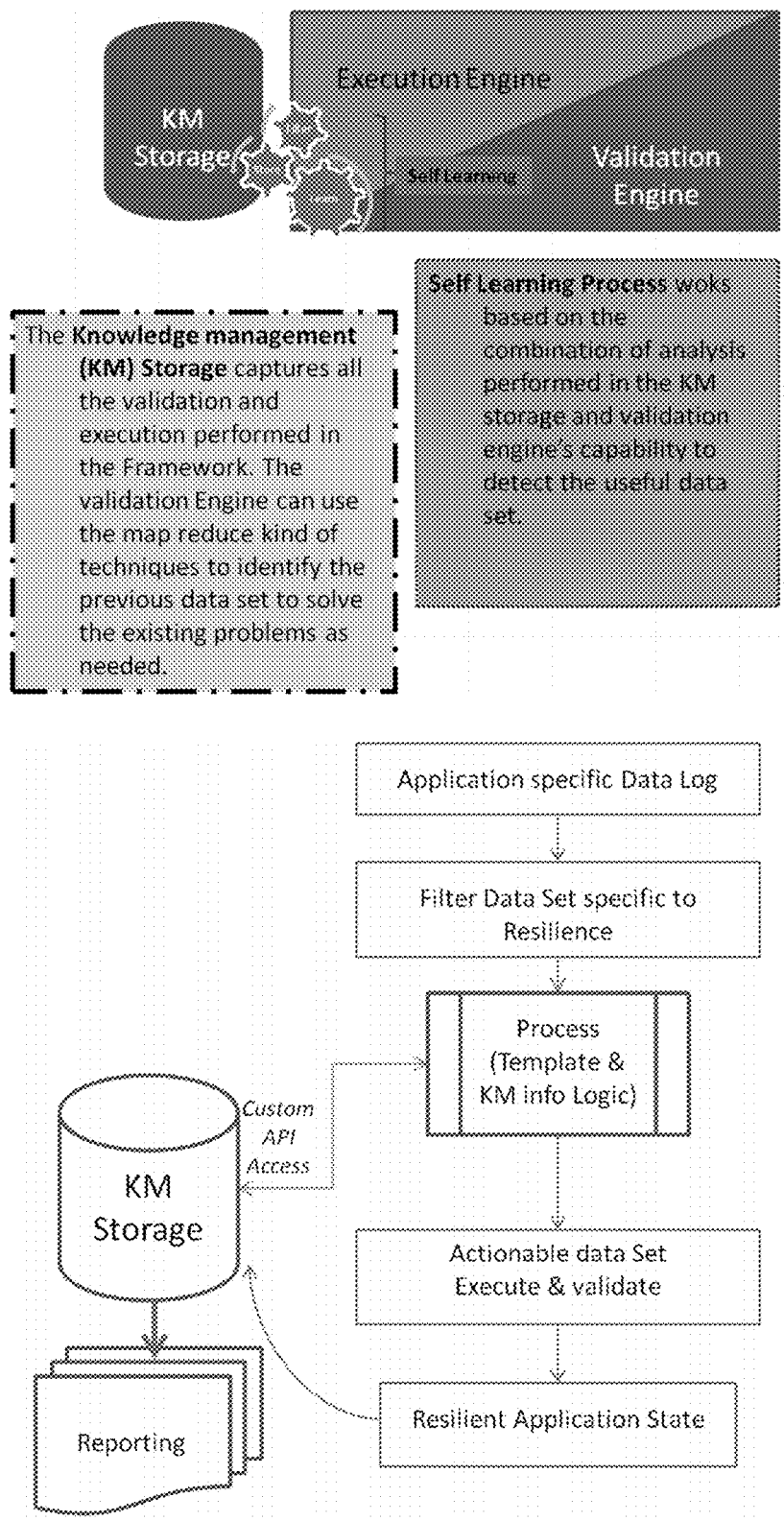
FIG. 4 illustrates a self-learning framework mechanism and a flow chart for self-learning, in accordance with an embodiment of the present disclosure.

Referring now to FIG. 4, a self-learning framework mechanism and a flow chart for self-learning is illustrated, in accordance with an embodiment of the present disclosure. In one implementation, the self-learning is to capture the rich resource of information available and process it for future usage. The relationship of the actions taken and the template data may be correlated and corresponding information will be stored in the database or a specific database such as knowledge management (KM) database may be used. The KM database may show task performed per app and what time line it happened. The resilience of the application may be easily detected from it for any time frame desired. The cloud providers may use this information to identify the application status and its issues associate with it. The same information may be shared among the developers to detect their applications effectiveness. A clear timelines and application specific action taken on them may give complete picture, how the application can be re-provisioned or redesigned to avoid future potential issues.

In one implementation, the self-learning process may be based on the combination of analysis performed in the KM storage and validation engine's capability to detect the useful data set. The KM storage may capture all the validation and execution performed in the framework. The validation engine can use the map reduce kind of techniques to identify the previous data set to solve the existing problems as needed.

In one implementation, the flow diagram for the self-learning may have following steps. In step 1, the data associated with a specific application is captured or retrieved from the engine of FIG. 3. In step 2, the data set specific to the resilience is filtered by data extraction. In step 3, the process template and the KM information logic is extracted from the data set and stored in the KM storage. In step 4, the actionable data set is executed and validated to fetch resilient application state. In step 5, the actionable data set is stored in the KM storage. In step 6, the required data from the KM storage is reported to the user.

Figure 5:
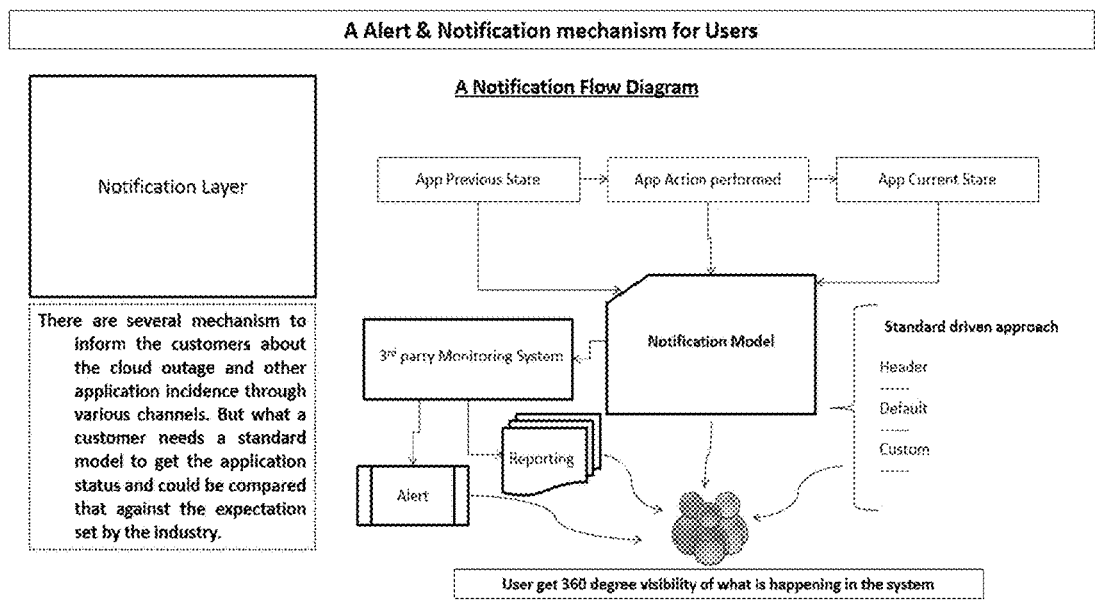
FIG. 5 illustrates an alert and a notification mechanism for users, in accordance with an embodiment of the present disclosure.

Referring now to FIG. 5, an alert and a notification mechanism for users is illustrated, in accordance with an embodiment of the present disclosure. There may be several mechanisms to inform the customers about the cloud outage and other application incidence through various channels. However, a customer may require a standard model to get the application status and could be compared that against the expectation set by the industry. Hence, according to the present disclosure and as shown in FIG. 5, even though the notification layer could remain same as the default one provided by the applications, the standard template driven approach used here, which has unique values. The notification format gives a standard interpretation of the application errors and how it recovered from it across the board for all kinds of applications. This information could be automatically processed using any third party solutions.

In one implementation, as shown in FIG. 5, the applications previous state, applications action performed, and the application current state, may be provided as an input the notification mechanism. As shown in FIG. 5, the notification mechanism may use any of the existing third parties monitoring system to report and alert the user about the application status. Also, the FIG. 5, shows a specific template for the present disclosure, which may be derived for notifying the user about the status of the application.

Figure 6:
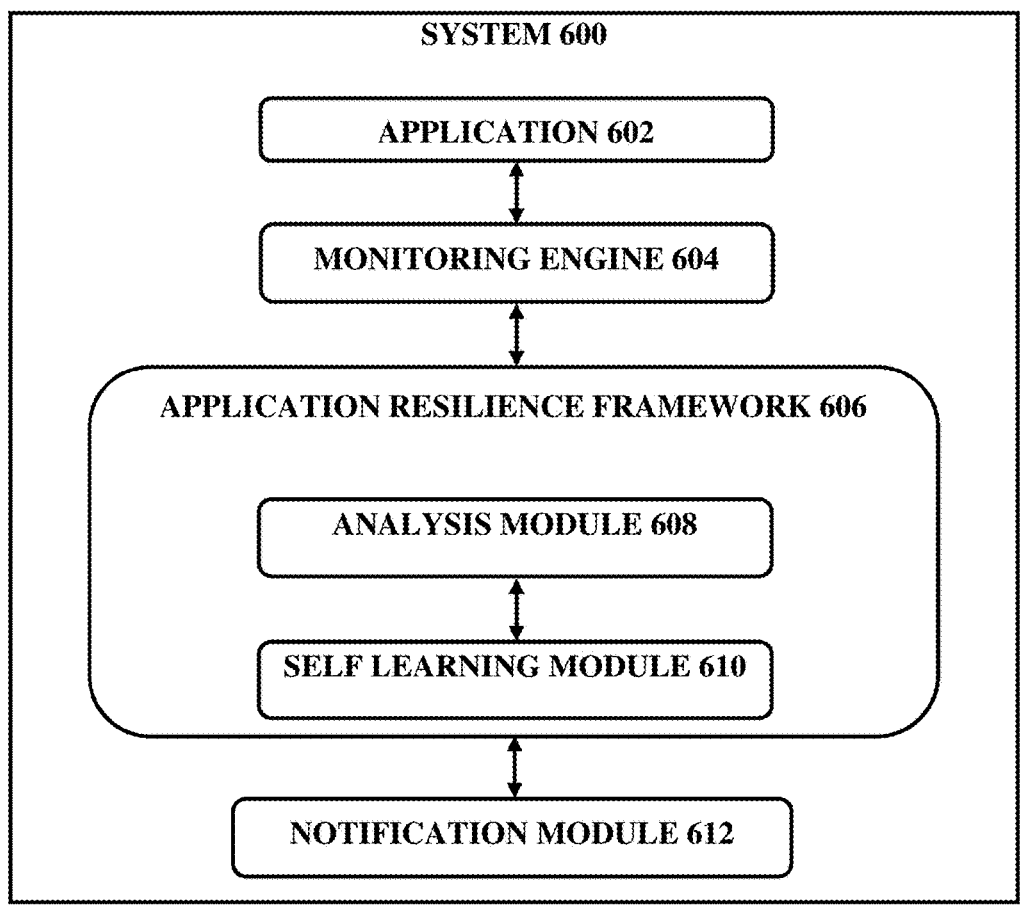
FIG. 6 illustrates an application resilience framework for at least an application deployed in PaaS, in accordance with an embodiment of the present disclosure.

Referring now to FIG. 6 illustrates an application resilience system for at least an application deployed in PaaS, in accordance with an embodiment of the present disclosure. In one implementation, a system 600, particularly, but not exclusively, a PaaS clouds having the application 602 deployed is disclosed. As shown in FIG. 6, the system 600 comprises a monitoring engine 604, an application resilience framework 606, and a notification module 612. The application resilience framework 600 comprises an analysis module 608, and a self-learning module 610. The monitoring engine 604 is configured to monitor the application 602 and capture the data associated with the application 602. The analysis module 608 is configured to analyze the data captured by the monitoring engine to associate at least an event retrieved from the data captured with at least one action in at least one pre-stored template, execute the action associated to the event, the action is at least specified in the pre-stored template, and thereby identify at least a status of the application. The self-learning module 610 coupled to the analysis module and is configured to fetch at least the data captured, the event retrieved from the data captured, the action associated with the event retrieved the action executed by the analysis module, and store in at least a repository. The notification module 612 having at least one notification template storing at least one value and is configured to notify at least the status of the application.

In one implementation, the pre-stored template is at least one of a default template and/or a custom template, the default template comprise at least one event and an action to be performed associated with the event for the application, and the custom template comprise at least one event and an action to be performed associated with the event for a specific application.

In one implementation, the default template comprise at least one file, a YAML file, describing the events and the actions associated with the events to be taken for application resilience.

In one implementation, the default template comprises at least one standard meta-tag to capture the actions associated with the application.

In one implementation, the pre-stored template is customizable and comprises actions to be performed for the application resilience.

In one implementation, the analysis module is configured to use at least a data association technique, a map reduce technique to fetch the data stored in the repository in cases if similar event occurs for the application.

In one implementation, the self-learning mechanism is configured to fetch at least the data captured, the event retrieved from the data captured, the action associated with the event retrieved the action executed by the analysis module, and filter the data captured by fetching at least a relationship of the action taken for the event, and the relationship is stored in the repository.

In one implementation, the repository stores the data in the form of the action performed per application along with an associated time of the action.

In one implementation, the status is displayed based on at least a previous state or an intermediate state representing the action performed or current state or any combination thereof.

In one implementation, the notifications are configured to be processed automatically using at least a third party solution.

In one implementation, the application is deployed on cloud platform, deployed on PaaS cloud.

In one implementation, an application resilience framework 606 for at least an application 602 is disclosed. The application resilience framework 606 comprises an engine 608 configured to analyze the data captured, by monitoring the application, to associate at least an event retrieved from the data captured with at least one action in at least one pre-stored template, execute the action associated to the event, the action is at least specified in the pre-stored template, and thereby identify at least a status of the application.

In one implementation, the application is monitored using at least an application monitoring means.

In one implementation, the pre-stored template is at least one of a default template and/or a custom template, the default template comprise at least one event and an action to be performed associated with the event for the application, and the custom template comprise at least one event and an action to be performed associated with the event for a specific application.

In one implementation, the default template comprise at least one file, a YAML file, describing the events and the actions associated with the events to be taken for application resilience.

In one implementation, the default template comprises at least one standard meta-tag to capture the actions associated with the application.

In one implementation, the pre-stored template is customizable and comprises actions to be performed for the application resilience.

In one implementation, the engine is configured to use at least a data association technique, a map reduce technique to fetch the data stored in the repository in cases if similar event occurs for the application.

In one implementation, the framework further comprises a self-learning module coupled to the engine and configured to fetch at least the data captured, the event retrieved from the data captured, the action associated with the event retrieved the action executed by the engine, and store in at least a repository, and a notification module having at least one notification template storing at least one value and configured to notify at least the status of the application.

In one implementation, the status identified is notified based on at least a previous state or an intermediate state representing the action performed or current state or any combination thereof.

In one implementation, the notifications are configured to be processed automatically using at least a third party solution.

In one implementation, the application is deployed on cloud platform, deployed on PaaS cloud.

In one implementation, an application resilience framework 606 for at least an application 602 is disclosed. The application resilience framework 606 comprises an engine 608 configured to analyze the data captured, by monitoring the application, to associate at least an event retrieved from the data captured with at least one action in at least one pre-stored template, the pre-stored template is customizable, execute the action associated to the event, the action is at least specified in the pre-stored template, and thereby identify at least a status of the application. The application resilience framework further comprises a self-learning module 610 coupled to the engine and configured to fetch at least the data captured, the event retrieved from the data captured, the action associated with the event retrieved the action executed by the analysis module, and store in at least a repository.

In one implementation, the application resilience framework 606 further comprises a notification module having at least one notification template storing at least one value and configured to notify at least the status of the application.

In one implementation, the status identified is notified based on at least a previous state or an intermediate state representing the action performed or current state or any combination thereof.

In one implementation, the notifications are configured to be processed automatically using at least a third party solution.

In one implementation, the application is deployed on cloud platform, deployed on PaaS clouds.

Figure 7:
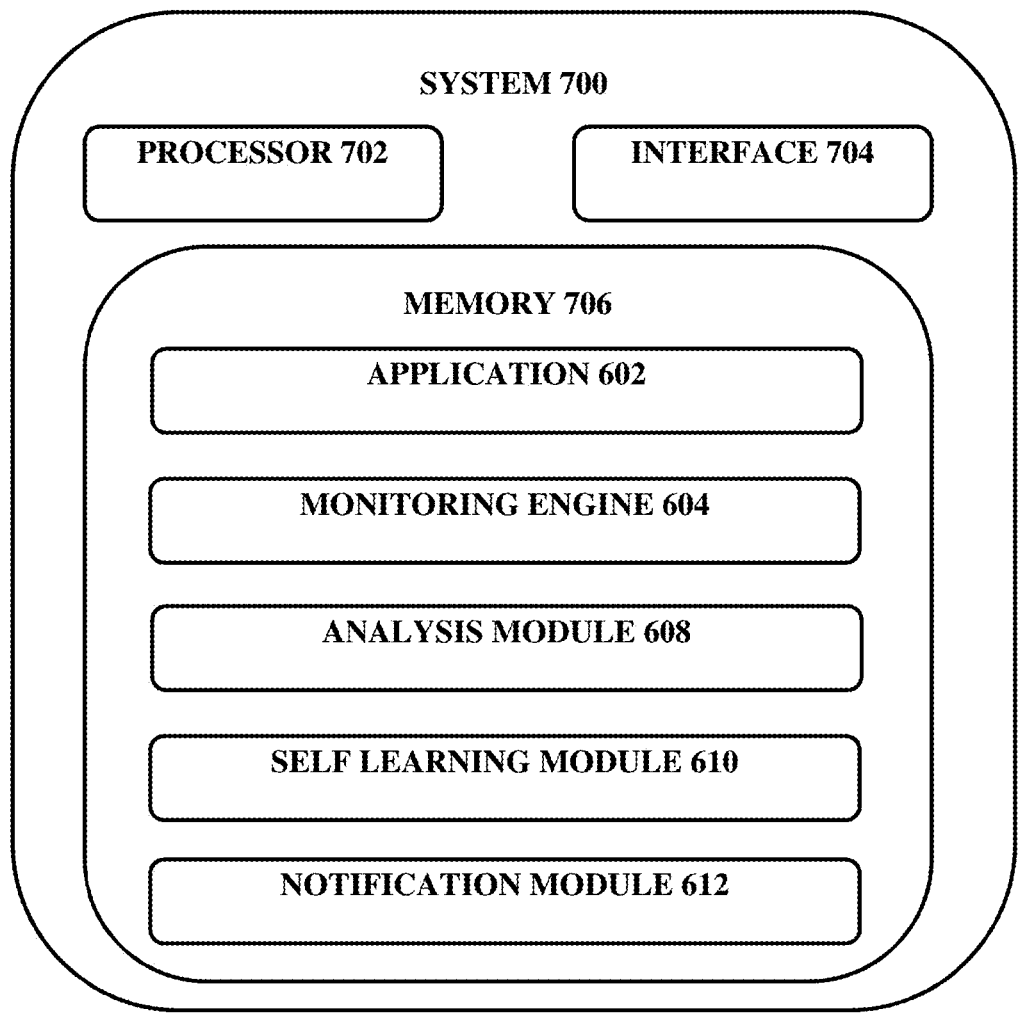
FIG. 7 illustrates an application resilience system for at least an application, in accordance with an embodiment of the present disclosure.

Referring now to FIG. 7 an application resilience system for at least an application is illustrated, in accordance with an embodiment of the present disclosure. In one implementation, the application resilience system 700 for at least an application 602 comprises a processor 702, and a memory 706 coupled to the processor for executing a plurality of modules stored in said memory 706.

Although the present disclosure is explained considering that the present disclosure is implemented as application resilience system 700, it may be understood that the application resilience system 700 may also be implemented in a variety of computing systems, such as a laptop computer, a desktop computer, a notebook, a workstation, a mainframe computer, a server, a network server, and the like. It will be understood that the application resilience system 700 may be accessed by multiple users, or applications residing on the application resilience system 700. Examples of the application resilience system 700 may include, but are not limited to, a portable computer, a personal digital assistant, a handheld device, sensors, routers, gateways and a workstation. The application resilience system 700 is communicatively coupled to other devices or a nodes or apparatuses to form a network (not shown).

In one implementation, the network (not shown) may be a wireless network, a wired network or a combination thereof. The network can be implemented as one of the different types of networks, such as Global System for Mobile communications (GSM), code division multiple access (CDMA), Long-Term Evolution (LTE), Universal Mobile Telecommunications Service (UMTS), intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol (TCP)/Internet Protocol (IP), Wireless Application Protocol (WAP), and the like to communicate with one another. Further the network may include a variety of network devices, including routers, bridges, servers, computing devices, storage devices, and the like.

The application resilience system 700 as illustrated in accordance with an embodiment of the present disclosure may include at least one processor 702, an interface 704, and a memory 706. The at least one processor 702 may be implemented as one or more microprocessors, microcomputers, microcontrollers, digital signal processors, central processing units, state machines, logic circuitries, and/or any devices that manipulate signals based on operational instructions. Among other capabilities, the at least one processor 702 is configured to fetch and execute computer-readable instructions or modules stored in the memory 706.

The interface 704 (e.g., input/output (I/O) interface) may include a variety of software and hardware interfaces, for example, a web interface, a GUI, and the like. The I/O interface 704 may allow the application resilience system 700 to interact with a user directly. Further, the I/O interface 704 may enable the system 700 to communicate with other devices or nodes, computing devices, such as web servers and external data servers (not shown). The I/O interface 704 can facilitate multiple communications within a wide variety of networks and protocol types, including wired networks, for example, GSM, CDMA, LAN, cable, etc., and wireless networks, such as wireless LAN (WLAN), cellular, or satellite. The I/O interface 704 may include one or more ports for connecting a number of devices to one another or to another server. The I/O interface 704 may provide interaction between the user and the application resilience system 700 via, a screen provided for the interface 704.

The memory 706 may include any computer-readable medium known in the art including, for example, volatile memory, such as static random access memory (SRAM) and dynamic random access memory (DRAM), and/or non-volatile memory, such as read only memory (ROM), erasable programmable ROM (EPROM), flash memories, hard disks, optical disks, and magnetic tapes. The memory 706 may include plurality of instructions or modules or applications to perform various functionalities. The memory 706 includes routines, programs, objects, components, data structures, etc., which perform particular tasks or implement particular abstract data types.

In one implementation, the plurality of modules may include but not limited to a monitoring engine 604, an analysis module 608, a self-learning module 610, and a notification module 612.

Figure 8:
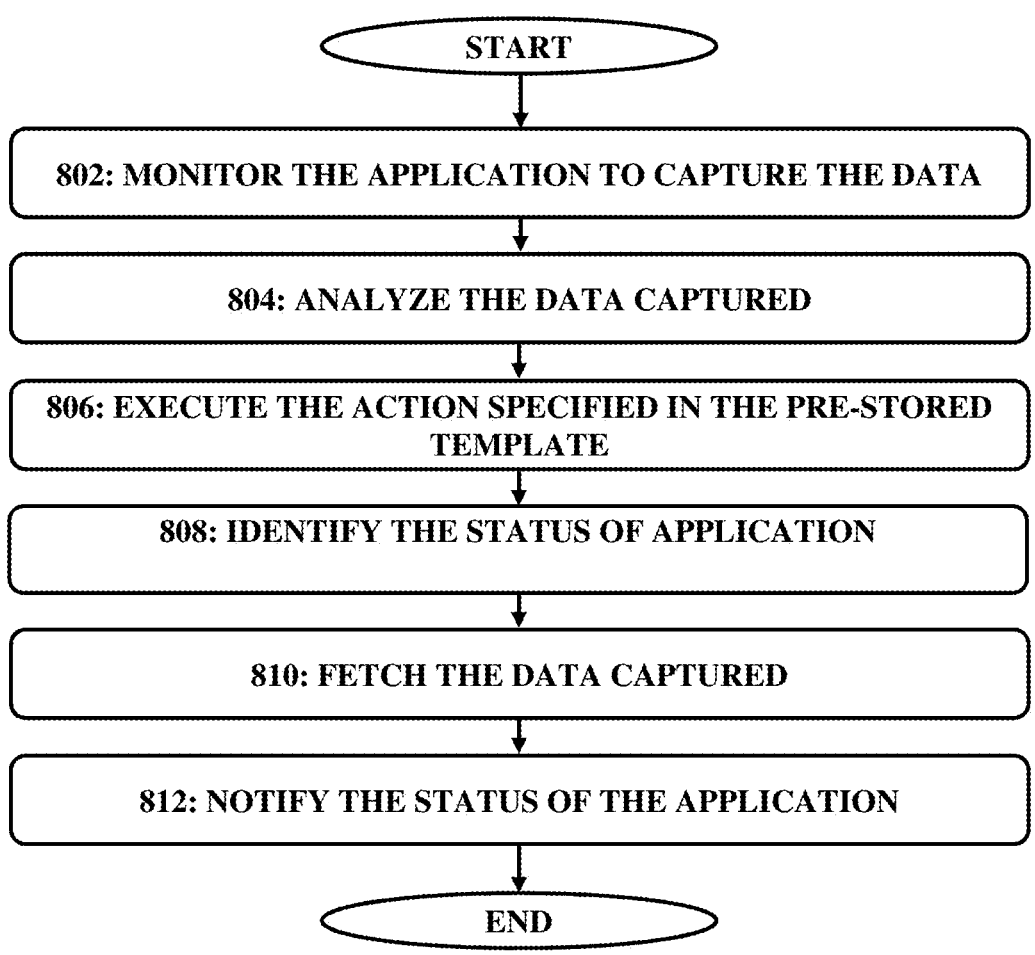
FIG. 8 illustrates an application resilience method for at least an application, in accordance with an embodiment of the present disclosure.

FIG. 8 illustrates an application resilience method for at least an application, in accordance with an embodiment of the present disclosure. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the disclosure described herein. Furthermore, the method can be implemented in any suitable hardware, software, firmware, or combination thereof. However, for ease of explanation, in the embodiments described below, the method may be considered to be implemented in the above described system 600 and/or system 700.

At block 802, the application is monitored using at least a monitoring means and thereby the data associated with the application is captured.

At block 804, the data captured is analyzed to associate at least an event retrieved from the data captured with at least one action in at least one pre-stored template. In one implementation, the pre-stored template is at least one of a default template and/or a custom template, the default template comprise at least one event and an action to be performed associated with the event for the application, and the custom template comprise at least one event and an action to be performed associated with the event for a specific application. The default template may comprise at least one file, a YAML file, describing the events and the actions associated with the events to be taken for application resilience. The default template may comprise at least one standard meta-tag to capture the actions associated with the application. The pre-stored template is customizable and comprises actions to be performed for the application resilience.

At block 806, the action associated to the event is executed as specified in the pre-stored template.

At block 808, at least a status of the application is identified.

At block 810, at least the data captured, the event retrieved from the data captured, the action associated with the event retrieved the action executed by the analysis module is fetched, and is store in at least a repository. In one implementation, the fetching may be achieved using at least a data association technique, a map reduce technique, the data stored in the repository in cases if similar event occurs for the application. In one implementation, the data fetched is filtered by retrieving a relationship of the action taken for the event, and the relationship is stored in the repository. The data is stored in the form of the action performed per application along with an associated time of the action.

At block 812, at least the status of the application is notified based on at least one notification template storing at least one value. In one implementation, the status is displayed based on at least a previous state or an intermediate state representing the action performed or current state or any combination thereof. The notification may be automatically processed using at least a third party solution.

In one implementation, an application resilience method for at least an application is disclosed. The application resilience method comprises analyzing the data captured, by monitoring the application, to associate at least an event retrieved from the data captured with at least one action in at least one pre-stored template, executing the action associated to the event, the action is at least specified in the pre-stored template, and thereby identifying at least a status of the application.

In one implementation, an application resilience method for at least an application, the application resilience method comprises analyzing the data captured, by monitoring the application, to associate at least an event retrieved from the data captured with at least one action in at least one pre-stored template, the pre-stored template is customizable, executing the action associated to the event, the action is at least specified in the pre-stored template, thereby identifying at least a status of the application, and fetching at least the data captured, the event retrieved from the data captured, the action associated with the event retrieved the action executed by the analysis module, and store in at least a repository.

Apart from what is explained above, the present disclosure also include the below mentioned technical effects.

I. The present disclosure helps the cloud applications porting from various competitor clouds—mainly the interoperability of the application resilience part. The present disclosure follows the standard for resilience applications and affirms the customers SLA in which cloud application will "never goes down—seven 9's guarantee".

II. The present disclosure further helps telecom application developers to write fool proof applications. In the case of telecom application failure for any error conditions, guarantee that application will come up with defined set of ways by telecom.

III. The present disclosure enables the application resilience across multiple data centers with multiple instances—if one instance of the application goes down, there is a high potential that the other instances may experience similar error conditions. According to the present disclosure, slowly one-by-one each of the applications can be brought to the desirable state, as needed, as defined in the framework.

IV. The present disclosure enables application portability through an easy template mechanism. The user customizable and human/machine readable YAML file make it very convenient for managing application FT in cloud.

V. Several techniques are employed by the vendors to make application resilience but there is no standard framework describes what application resilience in cloud means. This creates an uneasy environment for application developers, testers and also cloud providers. The present disclosure provides a mechanism to solve this problem vendor neutral and hence help the community.

VI. The present disclosure may be applicable in cloud application deployment including security, governance/compliance, etc.

VII. The present disclosure by providing a framework provides a new way to deal with application resilience in cloud PaaS. There are several components included in it and integration of all of them together makes sure the application availability in cloud.

VIII. Using the template based approach (user customizable) as disused in the present disclosure, the applications that perform common tasks as identified and assigned to the specific action in the template. Along with identifying the custom tasks for the applications and describe them too in the template. This is machine as well as human readable.

IX. The engine as discussed in the present disclosure have two unique jobs, one to validate the application state and other to involve the appropriate action for that validated application state.

X. The self-learning framework mechanism as discussed in the present disclosure is a dependent task of the main framework. This framework provides a unique way of storing the relevant information and retrieving it for the need is part of this mechanism.

XI. The alert and notification mechanism for users as discussed in the present disclosure is a dependent task of the main framework. The engine as such is generic but the information processed and shared are based on a unique template which is derived using the validation engine output, KM self-learning output and also the templates which is used for the action execution.

The present disclosure may be applicable in numerous environments, some of which are as provided below.

I. The architecture and methods described in the present disclosures may be used along with any cloud providers. Any providers could implement this ideas to make all the PaaS application deployed in it resilience. Create the framework and expose this to the developers. Any developers coming to the cloud platforms can design and develop an application with this framework. Typical telecom applications will be ideal candidates for this idea. All kinds of Telco providers, operators and app developers can use this agreeable standard and deploy applications to the cloud portal ease with conforming to the SLA.

II. An industry standard model may be developed. The primary purpose of the present disclosure is to align the expectations of all the parties involved in the application resilience to a common framework. Using the framework of the present disclosure all adhere to the same standard and hence guarantee the application resilience as well as portability among various cloud providers.

A person skilled in the art may understand that any known or new algorithms may be used for the implementation of the present disclosure. However, it is to be noted that, the present disclosure provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present disclosure.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present disclosure essentially, or the part contributing to the other approaches, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present disclosure. The foregoing storage medium includes any medium that can store program code, such as a universal serial bus (USB) flash drive, a removable hard disk, a ROM, a random access memory (RAM), a magnetic disk, or an optical disc.

Although implementations for application resilience framework and method thereof for applications deployed on platform have been described in language specific to structural features and/or methods, it is to be understood that the appended claims are not necessarily limited to the specific features or methods described. Rather, the specific features and methods are disclosed as examples of implementations of the application resilience framework and method thereof for applications deployed on platform.

What is claimed is:

1. An application resilience system for an application, comprising:
    a memory comprising instructions; and
    a computer processor coupled to the memory, wherein the instructions cause the computer processor to be configured to:
        analyze data captured, using a monitoring engine associated with the application, to associate an event retrieved from the data captured with an action in a pre-stored template;
        store the pre-stored template in the memory, wherein the pre-stored template associates the event with the action for the application, and wherein the pre-stored template associates the event with different actions for different applications such that actions are application specific;
        execute the action associated to the event, wherein the action is specified in the pre-stored template;
        identify a status of the application;
        fetch at least the data captured, the event retrieved from the data captured, or the action associated with the event retrieved;
        store the at least the data captured, the event retrieved from the data captured, or the action associated with the event retrieved in a repository; and
        notify the status of the application based on at least one notification template storing at least one value.

2. The application resilience system of claim 1, wherein the pre-stored template is at least one of a default template or a custom template, wherein the default template comprises least one event and an action to be performed associated with the at least one event for the application, and wherein the custom template comprising another at least one event and an action to be performed associated with the other at least one event for a specific application.

3. The application resilience system of claim 2, wherein the default template comprises at least one file describing events and actions associated with the events to be taken for application resilience.

4. The application resilience system of claim 2, wherein the default template comprises at least one standard meta-tag to capture actions associated with the application.

5. The application resilience system of claim 2, wherein the pre-stored template is customizable and comprises actions to be performed for application resilience.

6. The application resilience system of claim 1, wherein the instructions further cause the computer processor to be configured to set a data association technique to fetch the data captured stored in the repository when a similar event occurs for the application.

7. The application resilience system of claim 1, wherein the instructions further cause the computer processor to be configured to:
fetch at least the data captured, the event retrieved from the data captured, or the action associated with the event retrieved; and
filter the data captured by fetching a relationship of the action taken for the event, wherein the relationship is stored in the repository.

8. The application resilience system of claim 1, wherein the repository stores the data in a form of an action performed per application along with an associated time of the action performed.

9. The application resilience system of claim 1, wherein the application is deployed on a platform-as-a-service (PaaS) cloud.

10. An application resilience method for an application, comprising:
monitoring the application and capturing data associated with the application;
analyzing the data captured to associate an event retrieved from the data captured with an action in a pre-stored template;
storing the pre-stored template in a memory, wherein the pre-stored template associates the event with the action for the application, and wherein the pre-stored template associates the event with different actions for different applications such that actions are application specific;
executing the action associated to the event, wherein the action is specified in the pre-stored template;
identifying a status of the application;
fetching at least the data captured, the event retrieved from the data captured, or the action associated with the event retrieved; and
storing the at least the data captured, the event retrieved from the data captured, or the action associated with the event retrieved in at least a repository.

11. The application resilience method of claim 10, wherein the pre-stored template is at least one of a default template or a custom template, wherein the default template comprises at least one event and an action to be performed associated with the at least one event for the application, and wherein the custom template comprises another at least one event and an action to be performed associated with the other at least one event for a specific application.

12. The application resilience method of claim 11, wherein the default template comprises at least one file describing events and actions associated with the events to be taken for application resilience.

13. The application resilience method of claim 11, wherein the default template comprises at least one standard meta-tag to capture actions associated with the application.

14. The application resilience method of claim 11, wherein the pre-stored template is customizable and comprises actions to be performed for application resilience.

15. The application resilience method of claim 10, further comprising fetching, using a data association technique, the data captured stored in the repository when a similar event occurs for the application.

16. The application resilience method of claim 10, further comprising:
fetching the at least the data captured, the event retrieved from the data captured, or the action associated with the event retrieved; and
filtering the data captured by fetching a relationship of the action taken for the event, wherein the relationship is stored in the repository.

17. The application resilience method of claim 10, further comprising storing, in the repository, the data in a form of an action performed per application along with an associated time of the action performed.

18. The application resilience method of claim 10, wherein the application is deployed on a platform-as-a-service (PaaS) cloud.

19. A non-transitory computer readable storage medium storing instructions which, when executed by a computer device, cause the computer device to:
analyze data captured by monitoring an application to associate an event retrieved from the data captured with an action in a pre-stored template, wherein the pre-stored template is customizable;
store the pre-stored template in a memory of the computer device, wherein the pre-stored template associates the event with the action for the application, and wherein the pre-stored template associates the event with different actions for different applications such that actions are application specific;
execute the action associated to the event, wherein the action is specified in the pre-stored template;
identify a status of the application;
fetch at least the data captured, the event retrieved from the data captured, or the action associated with the event retrieved; and
store the at least the data captured, the event retrieved from the data captured, or the action associated with the event retrieved in at least a repository.

20. The non-transitory computer readable storage medium of claim 19, wherein the application is deployed on a platform-as-a-service (PaaS) cloud.

* * * * *